Figure 1:
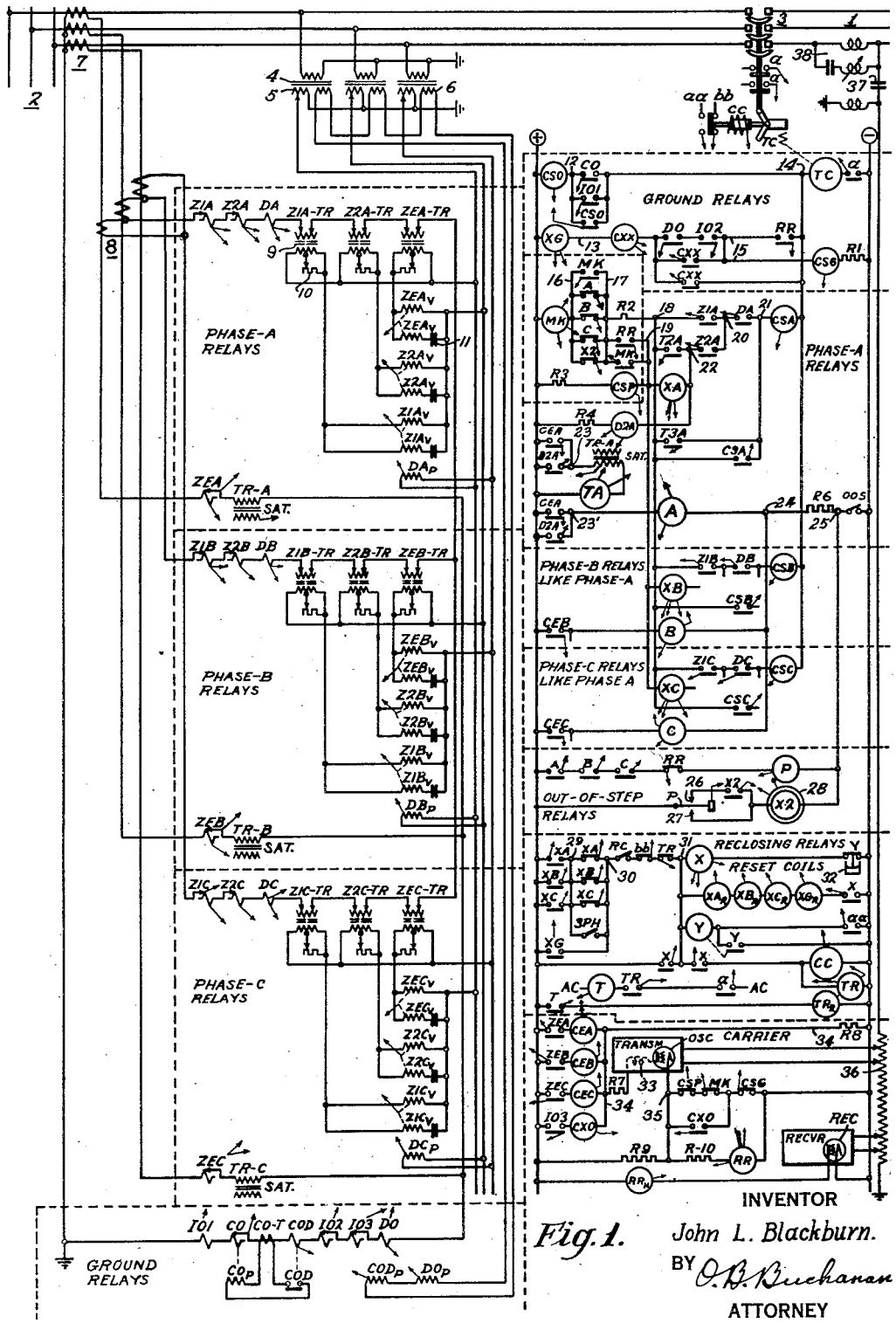

INVENTOR
John L. Blackburn.
BY O.B.Buchanan
ATTORNEY

March 20, 1951 J. L. BLACKBURN 2,545,987
PROTECTIVE RELAY FOR TRANSMISSION LINES
Filed Feb. 25, 1947     2 Sheets-Sheet 2
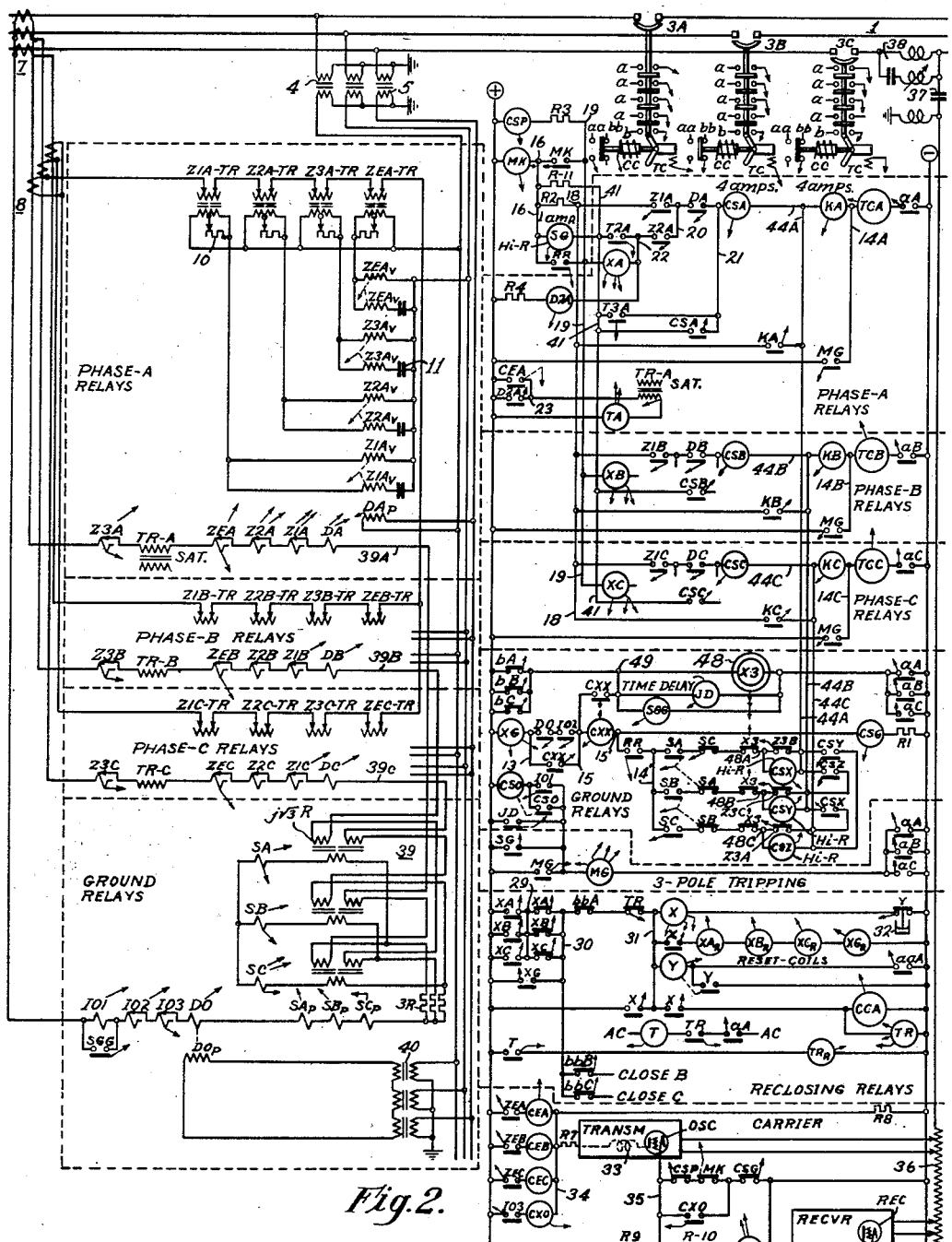
Fig.2.
Fig.3.
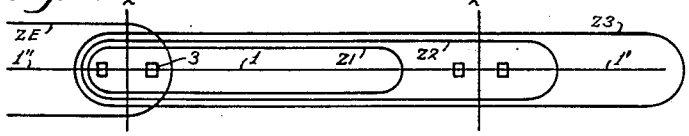
INVENTOR
John L. Blackburn.
BY O.B. Buchanan
ATTORNEY Patented Mar. 20, 1951

2,545,987

UNITED STATES PATENT OFFICE 2,545,987

PROTECTIVE RELAY FOR TRANSMISSION LINES

John L. Blackburn, East Orange, N. J., assignor to Westinghouse Electric Corporation, East Pittsburgh, Pa., a corporation of Pennsylvania Application February 25, 1947, Serial No. 730,683

21 Claims. (Cl. 175—294)

My invention relates to several novel features of high-speed protective relaying-systems for protecting transmission lines against faults or fault-caused outages. I use the term "transmission line" in its broad, general sense, including secondary transmission or distribution systems, as well as primary or high-voltage systems, and I generally think of a transmission line as being a part of a synchronous polyphase system, having synchronous machines at both ends thereof, which are to be kept in step or synchronism with each other.

An object of my invention is to provide selective breaker-reclosing on carrier-cleared faults, without any reclosing on first-zone-cleared faults, and of course no reclosing on time-delayed breaker-openings.

A further object of my invention is to provide means whereby reclosing may be blocked in the event of three-phase faults.

A further object of my invention is to provide novel relaying-circuits utilizing out-looking third-zone impedance-elements.

A further object of my invention is to provide a protective system for a three-phase transmission line having single-pole breakers, with single-pole opening or control in the event of a first-zone phase-fault tripping-operation, and also in the event of a carrier-controlled phase-fault tripping operation, and still further in the event of a carrier-controlled ground-fault phase-selector tripping-operation, (using the term "single-pole" in its broad sense, as will be subsequently described), while providing three-pole breaker-opening in the event of all other fault-responses, and reclosing the opened breaker or breakers only if the breaker or breakers had opened in response to a carrier-controlled fault, either a phase-fault or a ground-fault.

A further, though somewhat optional, object of my invention relates to the provision of carrier-starting on out-looking third-zone impedance-elements; and phase-selector supervision, for single-pole or selective-pole operation, in response to an in-looking third-zone impedance-element.

The significance of these various objects, and their relation to the prior art, will be pointed out in connection with the description of the invention which follows.

With the foregoing and other objects in view, my invention consists in the systems, combinations, elements, and methods of operation and arrangement, hereinafter described and claimed, and illustrated in the accompanying drawing, wherein Figure 1 is a simplified schematic diagrammatic view of a protective relaying-system including selective reclosing of gang-operated or three-phase breakers on carrier-cleared faults, but not on other types of faults, in accordance with my invention, Fig. 2 is a similar view showing a protective system utilizing single-pole breakers, and embodying various features of my invention, and Fig. 3 is a diagrammatic view showing the various "reaches" of the several impedance-relays or elements.

Fig. 1 shows one of the terminals of a protected line-section of a three-phase transmission line, which is connected to a station-bus 2, through a gang-operated or three-pole circuit-breaker 3, of the high-speed fault-clearing type for maintaining stability, as covered by the Evans et al. Patent 1,899,613, granted February 28, 1933. It will be understood, of course, that all of the line terminals are, or may be, similar to each other, so that a description of one will suffice for all.

The breaker 3 is provided with latched tripping and closing mechanisms, under the control of a trip coil TC, and a closing-coil CC, respectively, as shown in Figs. 1 and 2. Each breaker has a number of auxiliary contacts which are mounted on, or responsive to, the main-contact poles and the latched operating mechanism, respectively, including one or more pole-operated make-contacts $a$, which close when the main breaker-contacts close, one or more pole-operated back-contacts $b$, which close when the main breaker-contacts open, one or more mechanism-operated make-contacts $aa$, which close in the operative or closed position of the breaker-operating mechanism, and one or more mechanism-operated back-contacts $bb$, which close in an early part of the opening movement of the breaker-operating mechanism. As a rule, each breaker carries a large number of auxiliary contacts, which are variously utilized in the control-circuits. My accompanying drawings are simplified diagrams, intended to show only the barest elements of the relaying system, or enough to illustrate the novel features or principles of my present invention, and hence only a relatively few auxiliary breaker-contacts or switches are indicated.

The various relays which make up the protective-relaying systems, as shown in both Figs. 1 and 2, include various line-responsive relays, and various direct-current relays, the various coils and contacts of which are separated into alternating-current circuits and direct-current circuits, respectively, the various circuits being arranged, so far as practicable, after the manner of a schematic diagram or "across-the-line" diagram. In each case, the main or operating coil of the relay is given a letter-designation or legend, and the same letter-designation or legend is applied to all of the contacts of that relay. The relays and switches are invariably shown in their open or deenergized positions. When a given relay has, in addition to its main or operating winding, an auxiliary winding, such as a restraining holding, polarizing, or resetting coil or winding, the auxiliary winding is given the same letter-designation, with a subscript. Arrows or dotted lines are used, to symbolically indicate how the various parts of each relay are connected together. When corresponding elements are utilized in different phases, they are distinguished by suffixes, such as A, B and C, for the different phases. In the case of the impedance-relays Z, various suffixes, such as 1, 2, E and 3 are utilized, to indicate, respectively, first-zone relays, second-zone relays, outlooking or external-fault-responsive third-zone relays, and in-looking third-zone relays, respectively.

In Fig. 1, the voltage-coils of the alternating-current or line-responsive relays are energized by means of a set of star-connected potential-transformers 4 having star-connected secondary-windings 5 and open-delta-connected tertiary windings 6; while the current-coils are energized from star-connected line-current transformers 7, and auxiliary delta-connected current-transformers 8, as shown. The auxiliary delta-connected current-transformers 8 are broadly covered by the Lewis Patent 1,967,093, granted July 17, 1934.

The line-responsive relays in Fig. 1 include identical phase-A, phase-B and phase-C relays, so that a description of the phase-A relays will suffice for all. The phase-A relays include first-zone, second-zone and externally or out-looking third-zone impedance-relays Z1A, Z2A and ZEA, having current-responsive operating-coils, also marked Z1A, Z2A and ZEA, respectively, and voltage-responsive restraining-coils which are designated by the subscript $v$. These impedance-relays may be either straight impedance-relays, or modified impedance-relays as covered by the Goldsborough Patent 1,934,662, granted November 7, 1933, or the Goldsborough Patent 2,386,209, granted October 9, 1945, or the Goldsborough Patent 2,393,983, granted February 5, 1946. I have chosen, for illustration, the triple-adjustment, modified impedance-relays of the Goldsborough Patent 2,393,983, utilizing the external-directional or out-looking third-zone element as broadly covered by the Goldsborough Patent 2,386,209.

The triple-adjustment feature of the modified-impedance relays Z includes separate means for adjusting the size and position of the response-circle of the relay, when the relay-characteristics are plotted on rectangular coordinates representing the line-resistance and the line-reactance, respectively. The circle-characteristics to be adjusted are the circle-radius, the circle-offset, which is the displacement of the circle-center from the origin of the coordinates, and the circle-center angle, or the slope of the center-line which joins the circle-center to the origin.

The radius-adjustment of the impedance-relays is effected by means of a variable-turn adjustment on the operating-coils Z1A, Z2A and ZEA of the several relays.

The center-offset adjustment of the impedance-relays is obtained by adding a variable-magnitude current-responsive component to the voltage which is applied to each of the voltage-responsive restraint-windings Z1A$_v$, Z2A$_v$ and ZEA$_v$, which is accomplished by means of reactor-type transformers Z1A—TR, Z2A—TR and ZEA—TR, the primary windings of which are current-energized, while the secondary windings are connected in series with the several voltage-coils. These reactor-type transformers are designed to operate as two-winding reactors, having air-gap cores 9, as shown, so as to tend to produce a compensator-voltage which is displaced 90° with respect to the energizing-current. The magnitude-adjustment which controls the offset of the centers of the impedance-circles is obtained by a variable-turn primary-winding adjustment of the reactor-transformers Z1A—TR, Z2A—TR and ZEA—TR.

The center-angle adjustment of the impedance-relays is obtained by adjusting the phase-angle displacement of the current-responsive compensator-voltages, or the secondary voltages which are supplied by the several reactor-transformers Z1A—TR, etc. In my present diagrams, as shown in Figs. 1 and 2, the means for achieving a range of angular adjustment which is usually adequate is shown in an extremely simple and compact arrangement, having very few parts, and including simply an adjustable resistor 10 which is connected across a part of the secondary winding of each reactor-transformer Z1A—TR, etc. This variable secondary resistance 10 pulls back the phase-angle displacement of the reactor-transformer from 90° to variable amounts down to 60°, with respect to the phase of the current which energizes the primary winding of the reactor-transformer. This phase-angle adjustment is not absolutely independent of the circle-center adjustment, which has to be slightly readjusted for each phase-angle setting, but this slight disadvantage is compensated for by the much simpler phase-angle adjustment which is obtained, as compared with the more exact angle-adjusting means which is shown in the Goldsborough Patent 2,393,983, and which is specifically claimed, per se, in a Carlin application, Serial No. 583,926, filed March 21, 1945, patented January 17, 1950, No. 2,495,158.

It will be noted that there are two out-of-phase restraint-windings for each impedance-relay, such as the restraint-windings Z1A$_v$, for the first-zone phase-A impedance-relay Z1A. The flux of one of these restraint-windings Z1A$_v$ is dephased, as by means of a capacitor 11, so that the restraining-force, operating on the relay, will never be reduced to zero, thus avoiding relay-chattering, in a known manner.

The alternating-current, or line-responsive, phase-A relays of Fig. 1 also include a directional element DA, which is a flux-product-responsive relay having a current-energized main-winding DA, and a voltage-energized polarizing-winding DA$_p$.

In Fig. 1, delta-current, as supplied by the auxiliary current-transformers 8, is preferably used for all of the current-coils of the phase-relays, except for out-of-step protection, in which case the third-zone elements ZEA, ZEB and ZEC have their current-coils supplied with star-currents, from the line current-transformers 7.

The alternating-current, or line-responsive phase-A relays of Fig. 1 also include the primary winding of a saturating-transformer TR—A, which is connected in series with the ZEA operating-coil. This transformer is utilized for energizing the winding of a timer TA which is shown in the direct-current circuits.

The alternating-current, or line-responsive, relays of Fig. 1 also include a group of ground-fault-responsive relays, including three different instantaneous overcurrent relays marked IO1, IO2 and IO3, of successively increasing sensitivities, an inverse-time-operative slow-acting overcurrent relay CO, a directional ground relay DO, and an overcurrent-supervising directional relay COD. All of these ground-relays have coils which are energized in the residual-current circuit of the line-current transformers 7. The inverse-time overcurrent relay CO, the ground-directional relay DO, and the overcurrent-supervising directional relay COD are all product-type relays, having polarizing coils, which are indicated by the subscripts $p$. The polarizing coil $CO_p$ of the inverse-time overcurrent relay CO is shown diagrammatically as being energized from a current-transformer CO—T in series with the CO-winding, under the control of a make-contact COD of the relay COD. In the illustrated form of embodiment, in Fig. 1, the polarizing windings $DO_p$ and $COD_p$ are energized from the residual line-voltage, as furnished by the open-delta tertiary windings 6 of the potential-transformers 4, as covered by the Tippett Patent 1,920,329, granted August 1, 1933.

The schematic direct-current connections of Fig. 1 include a ground-relay panel, having two tripping circuits 12 and 13, connected to the positive bus (+), for energizing the trip-circuit bus or conductor 14, which energizes the trip-coil TC of the breaker 3, in series with one of the auxiliary breaker make-contacts $a$, and thence to the negative bus (—). The ground-fault tripping circuit 12 is instantaneously responsive to a make-contact IO1 of the insensitive, or heavy-current-responsive, instantaneous ground-relay IO1. Connected in parallel with the contact IO1 is also a make-contact CO of the inverse-time-responsive ground-overcurrent relay CO, which closes its contact in a time depending upon the severity of the ground-fault, this being a slow-acting relay for back-up protection. The two contacts IO1 and CO are also bypassed by a make-contact CSO of a contactor-switch having its operating coil CSO in the tripping circuit 12.

The ground-fault tripping-circuit 13 is an instantaneous carrier-controlled ground-fault tripping-circuit. In accordance with my present invention, it contains the operating coil of an auxiliary ground-fault relay XG which is utilized in controlling the selective reclosure of the circuit-breaker 3, when it has been tripped to its open position in response to the carrier-supervised ground-fault tripping-circuit 13. This tripping-circuit 13 is also shown as containing the operating coil of a contactor-switch CXX.

From the circuit 13 there are three branch-circuits or continuing-circuits. The first continuing-circuit includes the ground-directional make-contact DO, the ground-overcurrent make-contact IO2, a conductor 15, and a receiver-relay contact RR, which is connected to the trip-circuit bus 14. The receiver-relay contact RR closes in response to certain conditions at the relaying terminal and also certain conditions at the far line-terminal, in a known manner, as will be subsequently described. The second branch-circuit from the circuit 13 contains a make-contact CXX of the contactor-switch CXX, which bypasses the contacts DO and IO2, making connection to the conductor 15. The conductor 15 also energizes the operating-coil CSG of a directionally responsive ground-fault contactor-switch, the circuit of which is continued, through a resistor R1, to the negative bus (—) of the direct-current supply. The third branch-circuit from the circuit 13 includes another make-contact CXX, which is connected to the tripping-bus 14.

The direct-current relay-elements of the phase-A, phase-B and phase-C relays have certain common portions, and certain portions which are specific to the separate phases. The common phase-fault tripping-circuits include a conductor 16 which is energized from the positive bus (+) through the operating-coil of a master-contactor MK. The circuit 16 is joined to a circuit 17 through five parallel-connected contacts, including a make-contact MK of the contactor MK, three back-contacts A, B and C of instantaneous auxiliary relays A, B and C which are utilized for out-of-step protection, and a back-contact X2 of an auxiliary time-delay relay which is also associated with the out-of-step protection. The circuit 17 is joined to a circuit 18, through a small one-ohm resistor R2, or the like. The circuit 17 is further joined to a circuit 19, through two parallel-connected contacts, namely a make-contact RR of the carrier-current receiver-relay RR, which is to be subsequently described, and a make-contact MK of the contactor MK.

The conductor 18 is utilized to energize the instantaneous first-zone tripping-circuit, the time-delayed second-zone tripping-circuit, the time-delayed third-zone tripping-circuit, and the holding tripping-circuit, for each of the three phase-relays for the three line-phases A, B and C. As these relays are identical, a detailed showing and description of only the phase-A relays will suffice.

The first-zone phase-fault tripping-circuit includes an impedance-relay make-contact Z1A, which is connected between the circuit 18 and a circuit 20. The circuit 20 continues on, through a phase-directional make-contact DA, to a circuit 21, which in turn continues on, through the operating coil CSA of a contactor-switch, to the trip-circuit bus 14.

The second-zone, time-delayed tripping-circuit includes a timer-contact T2A which, when closed, connects the circuit 18 to a circuit 22. The timer-contact T2A is the first of two timer-contacts T2A and T3A which are carried by the timer TA. From the conductor 22, a circuit continues, through the impedance-relay make-contact Z2A, to the conductor 20.

The third and fourth phase-A tripping-circuits, which branch off, or continue on, from the conductor 18, contain the timer-contact T3A and the contactor-switch contact CSA, respectively, both of which connect the circuit 18 to the circuit 21.

The circuit 19 is utilized, in accordance with my present invention, to energize the operating-coils of three auxiliary relays XA, XB and XC, one for each of the three-line-phases. These coils, such as the coil XA, are connected between the conductor 19 and the conductor 22, in each of the phase-fault relay-assemblies. In this manner, the auxiliary phase-A relay XA is selectively energized in response to a carrier-controlled trip-circuit energization for that phase, which is obtained by the closure of the contacts RR, Z2A, and DA.

In the general phase-fault relaying-circuits which are common to all three phases, there is included a phase-fault auxiliary relay CSP, the operating-coil of which is connected between the positive bus (+) and the conductor 19, through a resistance R3.

In accordance with one feature of my invention, I provide an auxiliary relay D2A, one for each phase, which is responsive to a second-zone directional response, such as is obtained upon the closure of the relay contacts Z2A and DA for that particular phase. To this end, the operating-coil of the relay D2A is connected between the positive bus (+) and the conductor 22, through a resistor R4.

In accordance with one feature of my invention, I utilize a make-contact D2A of the directional second-zone relay D2A, in parallel with a make-contact CEA, of an auxiliary relay which is responsive to the out-looking third-zone impedance-relay ZEA, as will be subsequently described, and these two parallel-connected make-contacts D2A and CEA join the positive bus (+) to a circuit 23, which is utilized to energize the operating-winding TA of the phase-A timer TA from the secondary winding of the saturating transformer TR—A. When out-of-step protection is utilized, as shown in Fig. 1, another circuit 23', similar to the circuit 23 is also utilized to energize the phase-A out-of-step auxiliary relay A, in a circuit which then continues on, through a common star-point connection 24, of all three operating-coils A, B and C, from which the circuit is continued, through a resistor R6, to a conductor 25, and thence, through a manually controlled switch OOS, which can be closed to connect the circuit 25 to the negative bus (—), whenever out-of-step relay-protection is desired.

This completes the direct-current phase-A relay-connections. The phase-B and phase-C connections are similar, and need not be specifically shown or described.

The next panel or relay-group, in the direct-current schematic-diagram of Fig. 1, includes the out-of-step relays, including a circuit which serially includes three make-contacts A, B and C, and a receiver-relay back-contact RR, for energizing the operating-coil P of a pendulum-relay P, the circuit of which is completed through the conductor 25. The pendulum-relay is described and claimed in a Harder Patent 2,144,494, granted January 17, 1939. It is a part of a specific out-of-step protection-scheme, the basic features of which are covered by a Lewis Patent 2,005,149, granted June 18, 1935.

As shown in Fig. 1, the pendulum-relay contact P is in the form of a weighted reed which, in the normal deenergized position of the relay, lies horizontally out of contact with both an upper stationary contact 26 and a lower stationary contact 27. When the pendulum-relay P is energized, its movable contact P is lifted up against the upper stationary contact 26, and held there. When the pendulum-relay P is deenergized, its movable contact P swings down into momentary contact with the lower stationary contact 27 and immediately vibrates back again, finally coming to rest in its neutral central position. As shown in Fig. 1, the pendulum-relay contacts P, both upper and lower, are utilized to energize the operating-coil X2 of an auxiliary relay X2, which has a slow dropout time, which is sluggishly acting, as by means of a short-circuited slug or washer 28, which gives the relay a slight time-delay of about 3 or 4 cycles (on a 60-cycle basis), in closing its make-contact X2, said make-contact X2 being included in series with the upper contact 26 of the pendulum-relay P.

The next relay-panel of the direct-current schematic diagram, as shown in Fig. 1, includes the reclosing relays, which are specially controlled in accordance with my invention. Three make-contact XA, XB and XC of the several phase-fault-responsive reclosure-selecting relays XA, XB and XC, are connected in parallel with each other, to energize a conductor 29 from the positive bus (+). This conductor 29 is joined to a conductor 30, through four parallel paths, three of which include back-contacts XA, XB and XC, respectively, while the fourth parallel path includes a manually controlled switch marked 3PH, which can be closed whenever a breaker-reclosing operation is desired in response to a carrier-controlled tripping-operation for a three-phase fault. In many, if not most, cases, however, the manually-controlled switch 3PH will be left open, in which case an automatic breaker-reclosing operation will not be obtained in the event of a three-phase fault, because, in such an event, all three of the back-contacts XA, XB and XC will be opened. The conductor 30 is also energizable by means of a fifth energizing-circuit, including a make-contact XG of the ground-fault carrier-tripped reclosing-selecting relay XG, said make-contact XG being connected between the positive bus (+) and the conductor 30.

From the conductor 30, a more or less conventional breaker-closing circuit, or series of circuits, may be energized. A typical circuit is shown in Fig. 1, in which the conductor 30 is utilized to energize three serially connected contacts, shown as a manually controllable switch marked RC, an auxiliary breaker-contact bb, which closes at an early stage during the opening movement of the breaker-mechanism, and a back-contact TR of a toggle-relay or other position-retaining relay TR, which will be subsequently described. The switch RC is for the purpose of connecting or disconnecting the reclosing relays, at the option of the station-attendant or operator. These three serially connected contacts RC, bb and TR, are utilized to energize a conductor 31 from the conductor 30.

The conductor 31 is utilized to energize the operating-coil X of a closing-relay X, the circuit of which also includes the back-contact Y of a releasing relay Y. The back-contacts Y are a little slow in opening, in response to an energization of said releasing-relay Y, as is diagrammatically indicated by means of a dashpot 32.

In the practicing of my invention, the four reclosure-selecting relays XA, XB, XC and XG may, or may not, be of the position-retaining type. If these relays are not of the position-retaining type, they may sometimes instantly open, as soon as they close or respond, or at least the three phase-fault relays XA, XB and XC may do so, if their operating-coils, such as the coil XA, are shorted by a circuit such as 22—Z2A—20—DA—21—CSA make-contact—18—R2—17—MK— make-contact —19. The R2-resistance minimizes this possibility, but it is sometimes still a possibility. If the closing-relay X is quick enough in closing, to pick up its make-contact X and seal itself in, between the positive bus (+) and the conductor 31, before the relay XA drops out, after a momentary closure, the relay XA need not be a position-retaining relay, even though its operating-coil may become deenergized by a bypassing circuit containing the contactor-switch contact CSA. In the particular form of embodiment of my invention, which is shown in Fig. 1, all four of the reclosing-selector relays XA, XB, XC and XG are illustrated as of the position-retaining type, having reset-coils XA$_R$, XB$_R$, XC$_R$, XG$_R$ which are energized by a branch-circuit which is connected to the conductor 31, in series with a closing-relay make-contact X.

The conductor 31 is also energized, as previously mentioned, by a holding-circuit including a closing-relay make-contact X, which connects said circuit 31 to the positive bus (+).

The conductor 31 is also utilized, in Fig. 1, to energize the operating-coil Y of the releasing-relay Y, the circuit of which is completed by a breaker auxiliary switch *aa* which opens at an early stage during the opening-movement of the breaker-mechanism. The time-delay which is introduced by the dashpot 32 or other delaying means on the releasing-relay Y is sufficient to prevent the possibility of the opening of the releasing-relay back-contact Y prior to the opening of the auxiliary breaker-switch contacts *aa*. These switch-contacts *aa* are bypassed by a make-contact Y of the releasing-relay Y.

The next line of the schematic direct-current diagram in Fig. 1 shows a closing-relay make-contact X energizing the closing-coil contact CC of the circuit-breaker C from the conductor 31, and also energizing the operating-coil of the toggle-relay TR. The toggle-relay TR has a make-contact TR which energizes an alternating-current circuit, which is shown inset into the direct-current diagram of Fig. 1, to energize the winding T of a reclosing-relay timer T, in series with a circuit-breaker make-contact *a*, in a 60-cycle timer-circuit marked AC—AC. The timer T has a make-contact which energizes a reset coil TR$_R$ of the toggle-relay TR.

The last panel of the schematic direct-current circuits, in Fig. 1 shows the essential features of the carrier-current equipment, at least so much thereof as is necessary to an explanation of the present invention. The carrier-current equipment is intended to be representative of any communicating-means whereby a signal may be sent from one terminal of the protected line-section to another terminal thereof. The carrier-current equipment includes a transmitter, marked TRANSM, and symbolically represented by an oscillator-tube OSC having a radio-frequency choke-coil 33 in its plate-circuit. The carrier equipment also includes a receiver, marked RECVR, and symbolically represented by a receiver-tube REC.

In Fig. 1, I have shown the carrier-current transmission being initiated by the same kind of plate-circuit carrier-starting control which is described and claimed in a Lenehan application Serial No. 599,832, filed June 16, 1945, patented September 14, 1948, No. 2,449,490, except that I utilize out-looking third-zone impedance-elements ZEA, ZEB and ZEC, instead of in-looking elements Z3A, etc., as in the Lenehan control. The plate-current carrier-starting control, as shown in Fig. 1, comprises four parallel paths for energizing the plate-circuit control-bus 34; these four parallel paths including, respectively: the ZEA make-contact, with the CEA operating-coil in series therewith; the ZEB make-contact, with the CEB operating-coil in series therewith; the ZEC make-contact, with the CEC operating-coil in series therewith; and the IO3 make-contact, with the CXO operating-coil in series therewith.

The transmitter plate-circuit control-bus 34 is connected to the transmitter-plate through a resistor R7, and it is connected to the negative bus (−) through a resistor R8.

Because I utilize out-looking carrier-starting elements ZEA, ZEB and ZEC, I cannot connect the cathode-circuit transmitter-terminal 35 to the plate-circuit control-bus 34, as in certain previous transmitter-connections, but I connect the cathode-terminal 35 directly to the positive bus (+), through a resistor R9.

In Fig. 1, I have shown a cathode-circuit carrier-stopping control, as described and claimed in the Lenehan et al. Patent 2,255,934, granted September 16, 1941. This carrier-stopping control, as I have shown it in Fig. 1, comprises three serially connected back-contacts, CSP, MK and CSG, connecting the cathode-circuit terminal 35 of the transmitter-oscillator to the negative bus-terminal (−). The two serially connected back-contacts CSP and MK are bypassed by a make-contact CXO, which is responsive to the sensitive carrier-starting ground-relay IO3, thus being equivalent to another make-contact on the IO3 relay. This gives a directional ground-preference to the carrier-control, as broadly covered by the Goldsborough Patent 2,381,277, granted August 7, 1945. The MK back-contact is utilized in the carrier-stopping circuit, in series with the CSP back-contact, in order to keep the oscillator-cathode circuit open, even though the CSP operating-coil is short-circuited by the circuits connecting the positive bus (+) to the conductors 16, 17 and 19, as shown in Fig. 1 of my present drawing, and as also shown and described in the Goldsborough Patent 2,320,861, granted June 1, 1943.

The three serially connected carrier-stopping back-contacts CSP, MK and CSG are also utilized to control the operating-winding RR of the receiver-relay, by having said operating-coil RR and a resistor R—10 connected in parallel across these three serially connected back-contacts CSP, MK, and CSG, in the cathode-energizing circuit of the transmitter-oscillator. This receiver-relay RR is preferably of a differential type, having an operating-coil RR which is controlled by the local fault-responsive relays CSP, MK and CSG at the relaying-station, as just described, but also having a strong, overpowering holding-coil RR$_H$, which is shown, in Fig. 1, as being energized in the plate-circuit of the receiver-tube REC, in accordance with the Harder et al. Patent 2,144,493, granted January 17, 1939, covering a receiver-relay which is restrained by carrier, and also covering the general principles of the intermittent-carrier relaying-system which I have shown in the accompanying drawings.

In Fig. 1, the carrier-current transmitter and receiver are coupled to a coupling-transformer 36, which is connected between ground and a coupling-capacitor 37 which is connected to one of the phase-conductors of the protected line-section 1, on the line-side of a carrier-frequency trap 38, as more specifically shown and claimed in the Langguth et al. Patent 2,005,147, granted June 18, 1935.

In the operation of my protective relaying system which is shown in Fig. 1, the following novel features should be noted, in addition to the features which are already known in the art, and which are described in previous patents which are referred to. For example, the out-of-step relaying-equipment is covered by the Lewis Patent 2,005,149 and the Harder Patent 2,144,494, and needs no detailed description. In like manner, the details of the reclosing-relays, from the conductor 30 on, are already known, and are fully described, for example, in my Patent 2,416,677, granted March 4, 1947.

The novel operating-features of Fig. 1 include a selective breaker-reclosing operation, which is obtained only on carrier-cleared faults, and not on phase-faults which are cleared on first-zone operation of the impedance-relays Z1A, Z1B or Z1C, or on any other fault-clearing operation except the carrier-controlled ground-fault tripping-circuit 15, and the carrier-controlled phase-fault tripping-circuits which are energized from the conductor 19 and the selector-relay coils XA, XB or XC. The circuit 15 and the conductor 19 both have a receiver-relay make-contact RR in series with them. The carrier-cleared ground-fault tripping-circuit 15 includes a circuit-portion 13 including the operating-coil XG of the ground-faul reclosing-selector XG. The three carrier-cleared phase-fault tripping-circuits, which are energized from the conductor 19, contain the respective operating-coils XA, XB and XC of the respective phase-fault reclosing-selector relays XA, XB and XC. These four reclosing-selector relays XG, XA, XB and XC are all responsive to a fault-detecting means which responds to faults which are beyond the remote terminal of the protected line-section, with a current-direction looking into the protected line-section from the relaying terminal, plus a receiver-relay response to the receipt of a signal from the remote terminal of the protected line-section.

The signal, which is received from the remote end, is the discontinuance of carrier. Whenever an external fault occurs, one or more of the sensitive carrier-starting fault-detectors ZEA, ZEB, ZEC or IO3 initiates carrier-current transmission. If the fault-current direction is in-looking, at each of the carrier-transmitting terminals, carrier-current is immediately removed (if it has been turned on), from the protected line-section, by the opening of one of the cathode-circuit-controlling back-contacts CSP, MK or CSG at each of the line-terminals. The signal which is received, at either terminal, from the remote terminal of the protected line-section, is the simultaneous removal of carrier and the simultaneous energization of the receiver-relay operating-coil RR which is connected in shunt across the three serially connected carrier-stopping back-contacts CSP, MK and CSG. When the carrier is removed from both, or all, of the terminals of the protected line-section, the receiver-energized holding-coil RRH of the receiver-relay RR is deenergized, and the receiver-relay picks up its make-contacts RR in the carrier-cleared tripping-circuits 15 and 19. The carrier-stopping back-contacts CSP and CSG are responsive, through the operating-coils CSP and CSG, to an in-looking fault-detection, reaching out to faults beyond the remote terminal of the protected line-section, this in-looking fault-detection being the same as that which is utilized, in series with the receiver-relay make-contacts RR, to energize the several reclosing-selector relays XA, XB, XC and XG.

The actuation of any one of the reclosing-selector relays XA, XB, XC or XG energizes the circuits 29 or 30, respectively, which are utilized for setting in motion a reclosing operation of the breaker which is in the process of opening in response to the fault. This is a selective reclosing-operation which is initiated only if the breaker-tripping circuit was one which is supervised by carrier, that is, a tripping-circuit which includes a receiver-relay make-contact RR in it.

A reclosing-operation is not desired for faults which are cleared by back-up protection, because the back-up protection is responsive to faults which are outside of the protected line-section.

A reclosing-operation is not desired, in response to a first-zone phase-fault tripping-operation, such as an operation in response to the phase-A tripping-circuit 17—R2—18—Z1A—20—DA—21—CSA coil—14, because the first-zone impedance-relay, such as Z1A, responds to close-in faults which are so close to the relaying station that they are not reached by the first-zone impedance-elements at the remote end of the protected line-section. The first-zone impedance-element Z1A, at the relaying station, responds to these close-in phase-A faults within about one cycle (assuming a 60-cycle line), whereas the second-zone phase-A impedance-element, at the remote terminal, requires some two to three cycles to respond to this same fault. It is not desirable to start a reclosing operation until the completion of the fault-detecting response which initiates the tripping-operation at the remote terminal, and hence it is desirable to block a reclosing operation in the event of a first-zone tripping-operation, and to wait for a second-zone impedance-relay response, and for a carrier-transmitted remote-end signal thereof, before initiating a reclosing operation at either end of the protected line-section.

In these ways, I make reasonably sure that the circuit-breakers 3, at both ends of the protected line-section, are opened or opening, before initiating a reclosing-operation at either end, thus making sure that both breakers get opened, thus "clearing" the fault, before the reclosing-operation can be completed.

Another novel feature of operation, in the form of embodiment of my invention which is shown in Fig. 1, is the use of the four parallel-connected circuits, in the reclosing panel, between the conductors 29 and 30. These four parallel-connected circuits include the three back-contacts XA, XB and XC, and a manually controlled switch marked 3PH. When the manually controlled switch 3PH is open, the three parallel-connected back-contacts XA, XB and XC serve the purpose of selectively responding to a three-phase fault by breaking the reclosing-circuit between the conductors 29 and 30, thus blocking a reclosing operation in the event of a three-phase fault, while permitting a reclosing operation in response to unbalanced phase-faults. On most transmission-systems, it is undesirable to attempt to reclose the breakers in the event of a three-phase fault, because such faults, even when a fault occurs substantially simultaneously on all three line-phases, (which is rare), will almost certainly not be an arcing type of fault which will clear itself within a few moments after power is removed from both ends of the faulted line-section. In those transmission-systems in which conditions may exist producing three-phase faults of a type which is self-clearing, a reclosing breaker-operation may be obtained by closing the manually controlled switch marked 3PH, which short-circuits the three parallel-connected back-contacts XA, XB and XC between the conductors 29 and 30 in the reclosing-panel.

The broad principle of high-speed reclosing, for obtaining service-continuity, is covered in the Griscom Patent 2,005,140, granted June 18, 1935.

A discriminatory reclosure-system has previously been known, as covered by the Goldsborough and Smith Patent 2,329,043, granted September 7, 1943, but that scheme differed from my present scheme in making the discrimination between phase-faults and ground-faults, whereas my present scheme recloses the breakers for both phase-faults and ground-faults, but makes the discrimination between carrier-cleared faults and faults which are not simultaneously cleared at both ends with the aid of carrier. It is possible, of course, to incorporate the Goldsborough and Smith phase-fault-discriminatory idea in my invention, while retaining the essential carrier-clearance-discriminatory feature, by omitting my ground-fault-responsive make-contact XG between the positive bus (+) and the conductor 30 in the reclosing-relay panel. The reason why it may be sometimes desirable to block reclosing on ground-faults, is the possibility of a broken line-conductor falling on a hard dry ground, which causes only very weak, and usually intermittent or sputtery, ground-fault currents which are not of sufficient strength to pick up the phase-fault relays. A circuit-breaker reclosure, on such a fault, would be a hazard to the life of a chance passer-by who might come in contact with the faulty wire.

Another discriminatory reclosure-system has also been previously known, as covered in my previously mentioned patent, which selectively recloses the breakers at both ends of the protected line-section in response to internal faults, as distinguished from faults located outside of the protected section, but this previously known internal-fault-selective reclosing-system initiated a reclosing-operation in response to a first-zone phase-fault tripping-operation, as well as responding to carrier-cleared tripping-operations, whereas my present invention avoids a reclosing-response to a first-zone phase-fault tripping-operation, for the reasons which I have already explained.

The normal operational features of my invention, as shown in Fig. 1, also include a novel method and means for energizing the timer, such as the phase-A timer TA, which controls the back-up protective tripping-operations. This timer has previously been commonly controlled by the sensitive phase-fault detectors, such as an in-reaching third-zone impedance-element, commonly designated Z3A, which has a longer distance-reach than the second-zone impedance-element Z2A in the in-looking direction, that is, still further beyond the remote end of the protected line-section than the second-zone element Z2A. In my present invention, I utilize an out-looking third-zone impedance-element, which I have designated ZEA, and I control the back-up tripping-timer TA in response to the out-looking impedance-relay ZEA, and also in response to the in-reaching second-zone impedance-relay Z2A. The Z2A timer-controlling response may also include an in-looking directional response, as has been done, in Fig. 1, by means of the relay D2A. The ZEA timer-controlling response is obtained, either by an extra contact on the ZEA relay or, as shown, by utilizing an auxiliary relay CEA, which avoids the necessity of multiplying the number of contacts on the sensitive ZEA relay.

The significance of my novel trip-circuit timer-control, in Fig. 1, will be better understood by reference to Fig. 3. In Fig. 3, the protected line-section I is diagrammatically shown, by a single-line diagram, as extending between the station-buses 2 and 2'. The circuit-breaker 3 is indicated schematically by a small rectangle in Fig. 3. The next succeeding line-section is indicated at 1', and the next preceding line-section is indicated at 1". The "reaches," of the various impedance-elements, are indicated in Fig. 3, by loops Z1, Z2 and Z3 and ZE, bearing the same designations as the corresponding relays. It is assumed that all of the phase-fault impedance-relays are of the modified-impedance type having the triply adjustable impedance-circle control which is described and claimed in the Goldsborough Patent 2,393,983. The Z3 loop which is shown in Fig. 3 represents the "reach" of an in-looking third-zone impedance-element, whereas the ZE loop, in Fig. 3, represents the "reach" of an out-looking impedance-element such as I utilize, and which may be referred to as a third-zone out-looking element, although its sensitivity or reach is not necessarily related to the reach of the second-zone element.

The in-looking modified-impedance elements, such as Z1, Z2 and Z3, respond selectively to faults which are on the line-side of the station-bus 2 at the relaying terminal, as shown in Fig. 3, and these in-looking modified-impedance elements have a short but substantial outwardly-looking, or backwardly stretching, reach, which is usually considerably less than half of the length of the protected line-section I. On the other hand, the outwardly looking modified-impedance element, such as ZE in Fig. 3, has a long reach in the backwardly extending direction or out-looking direction, looking out or away from the protected line-section I at the relaying bus 2, while it has a short but substantial inwardly-looking reach which is, or may be, considerably less than half the length of the protected line-section I. The inwardly-looking reach of the Z1 element is usually about 80% of the length of the protected section I; the inwardly-looking reach of the second-zone element Z2 is somewhat more than 100% of the length of the protected section I, while the inwardly-looking reach of the in-looking third-zone element Z3 (if it is used) has a reach somewhat longer than the second-zone element, as shown in Fig. 3.

In Fig. 1, the back-up tripping-timer TA is set in motion, so as to respond to externally looking faults, by the CEA make-contact of the circuit 23, whenever the ZEA element responds; and this timer TA is also set in motion by the D2A contact, in response to inwardly-looking faults (as determined by the DA contact), when the Z2A element is also energized in addition to the inwardly-looking directional contact DA, thus energizing the D2A relay-coil which is connected between the conductor 22 and the positive bus (+), in Fig. 1.

As a result of these back-up tripping-timing connections of Fig. 1, I obtain a novel kind of back-up protection for the transmission line or system, as will be understood from Fig. 3. The primary tripping-protection is, of course, the quick or instantaneous fault-tripping protection which is obtained for all internal faults which occur anywhere within the confines of the protected line-section I. The back-up protection is a time-delayed tripping-operation which occurs for faults which are located outside of the protected line-section, and which should have been cleared by the primary tripping protection which is provided in the line-section in which the faults are located, but which were not so cleared, because of some failure of the primary tripping protection in the faulted section.

Heretofore, the first back-up protection has been obtained in joint response to the first timer-contact, or so-called second-zone timer-contact T2A, and the second-zone impedance-relay contact Z2A, in series with the in-looking phase-fault directional contact DA, so as to respond to faults lying in the first portion of the next succeeding line-section which is designated 1' in Fig. 3. Heretofore, the second back-up tripping-protection has been obtained with the second timer-contact, or so-called third-zone timer-contact T3A, an in-looking third-zone impedance-element such as indicated at Z3 in Fig. 3, and the in-looking directional contact DA, so as to respond to faults further out in the next succeeding line-section 1', or even beyond that line-section.

On the contrary, in my present invention, as shown in Fig. 1, the second back-up tripping-protection, or the so-called third-zone protection, is obtained in response to the third-zone timer-contact T3A, without supervision by the in-looking directional contact DA; and in my case, I energize the timer TA in response to out-looking faults, as controlled by the ZEA element and its auxiliary contactor or relay CEA, so that the third-zone timer-contact T3A, in the tripping-circuit, responds to faults in the other direction, that is, back of the station-bus 2 at the relaying terminal, so that my third-zone tripping-protection is responsive to faults located back in the preceding line-section 1'' in Fig. 3, or even further back than that. In order to obtain the same kind of second-zone protection as formerly, I have to make the back-up tripping-timer TA responsive also to the second-zone faults, which I have done by means of the relay D2A, as previously described.

My invention is shown, in Fig. 1, in connection with a gang-operated or three-pole breaker 3, but it is also applicable to single-pole breakers and breaker-operation. Expressions, like single-pole tripping, have heretofore been sometimes used, in contradistinction from selective-pole tripping, to refer to the particular type of single-pole breaker-operation which was originally shown in the broad Goldsborough Patent 2,320,861, granted June 1, 1943, which is the generic patent on single-pole breaker-operation, but which specifically disclosed a system in which the single-pole breakers were tripped only in response to faults involving not more than one phase-conductor, with a tripping of all of the breakers if a single-pole breaker should reopen too often, in an attempt to clear any particular fault. The term, selective-pole tripping, has sometimes been used, in a distinguishing way, to designate the particular type of single-pole tripping which is shown and claimed in a Goldsborough application Serial No. 569,181, filed December 21, 1944, patented February 22, 1949, No. 2,462,179, which selectively responds to any kind of unbalanced fault, with the opening of the minimum number of single-pole breakers necessary to clear the fault. In my present application, I use the term "single-pole" in its generic sense, including both of these, and any other, types of single-pole breaker-operation.

In Fig. 2, I have shown the protective relaying apparatus of Fig. 1, as applied to single-pole breaker-operation, with certain minor variations and simplifications. For example, in order to reduce the complication of the diagrams, I have omitted, in Fig. 2, the inverse-time ground-fault relay CO which is shown in Fig. 1, and also the out-of-step relays which are shown in Fig. 1. I wish it to be understood, however, that these features are applicable also to the form of embodiment of my invention which is shown in Fig. 2. In Fig. 2, I have also incorporated certain additional features of my invention, which are particularly applicable to single-pole breaker-systems.

In Fig. 2, the gang-operated circuit breaker 3 of Fig. 1 is replaced with three single-pole breakers 3A, 3B and 3C. In order to adapt the reclosing system of Fig. 1 to single-pole breaker-control, in Fig. 2, I have added an in-looking third-zone relay in each phase, as indicated at Z3A, Z3B and Z3C respectively, and a phase-selector relay for each phase, as indicated at SA, SB and SC, respectively. The in-looking third-zone impedance-relay, such as Z3A, is illustrated as being of the same modified-impedance type which has already been described in connection with Fig. 1, differing from ZEA element in that its current-responsive compensator-voltage, of the reactor-transformer Z3A—TR, is reversed with respect to that which is utilized for the outwardly-looking element ZEA. While, in many cases, I prefer to supervise the phase-selectors SA, SB, SC with in-looking third-zone impedance elements Z3A, Z3B, Z3C, as shown, it is possible to substitute second-zone impedance-elements for this purpose, in combination with the directional elements for imparting the in-looking quality, as covered by the Goldsborough Patent 2,320,861.

The phase-selectors SA, SB and SC, in Fig. 2, are fault-phase selectors, as described and claimed in the Goldsborough Patent 2,320,861, these selectors being directional or product-responding relays which compare the zero-sequence line-current component with the various phases of the negative-sequence line-current component. As described in the Goldsborough Patent 2,320,861, the phase-selectors SA, SB and SC are pure watt-elements, having a maximum response when the two impressed currents are in phase with each other. As shown in Fig. 2, the star-points of the relaying currents which are supplied by the line-current transformers 7 are opened up, as shown at 39A, 39B and 39C, and connected in series with a negative-sequence filter-network 39, which is constructed along the principles explained in the Lenehan Patents 2,161,829 and 2,309,649 of June 13, 1939, and February 2, 1943, respectively. The negative-sequence filter 39 delivers, to the main coils of the selectors, such as the SA-coil, a voltage equal to 3R times $I_A$, which is the line-current in that phase, plus $j\sqrt{3}R$ times $(I_C-I_B)$, or the difference between the leading and lagging line-phase currents.

In Fig. 2, star-current is preferably used for all of the phase-relay elements, except the reactor-type transformers, Z1A—TR, Z2A—TR, Z3A—TR and ZEA—TR, and the like, which receive delta-current. These connections assure that only one phase of the phase-relays will operate on line-to-ground faults, which is desirable in the relaying apparatus for single-pole circuit breakers. At the same time, the delta-current in the reactor-type transformers means that there will be no shift in either the circle-offset or the circle center-angle for three-phase faults or phase-to-phase faults.

In Fig. 2, the current-coil 101 of the heavy-current instantaneous ground-relay IO1 is shunted by the make-contact SGG of an auxiliary relay which will be subsequently described.

The other alternating-current connections of Fig. 2 are the same as those which have already been described for Fig. 1, except to note that the delta-connected tertiary windings 6 of the potential-transformers 4 have been omitted in Fig. 2, and replaced by a set of auxiliary potential-transformers 40 having delta-connected secondary-windings for energizing the polarizing coil DO$_P$ of the ground-directional relay DO.

In regard to the schematic direct-current circuits of Fig. 2, it will be noted that these circuits embody many of the features which have already been described in connection with Fig. 1, with certain rearrangements of circuits, and with the two simplifying omissions which have already been noted. My subsequent explanation of the direct-current Fig. 2 circuits will be directed more particularly, therefore, to the points of difference between Fig. 2 and Fig. 1.

In Fig. 2, instead of having only one trip-coil TC to be controlled, there are three trip-coils TCA, TCB and TCC, having their own trip-circuits 14A, 14B and 14C, which are to be separately controlled, one for each of the single-pole breakers 3A, 3B and 3C. In like manner, there are three separate closing-coils CCA, etc.

In Fig. 2, in the phase-fault-relays, instead of utilizing the resistor R2 and the conductor 18 for energizing the time-delayed back-up tripping-circuits, as in Fig. 1, a conductor 41 is utilized for this purpose, in Fig. 2; and the conductor 41 is joined to the conductor 16 by a high-resistance operating-coil SG of a very sensitive back-up tripping-responsive relay SG, which responds to a very small current flowing in the tripping-circuit, as indicated by the legend "1 amp." which indicates the pick-up current of the SG relay. This is much less than the tripping-current necessary to operate the trip-coils such as TCA, which should receive at least 4 amperes. Thus, the previously described CSA relay is a relay which picks up at between 1 and 4 amperes, as indicated by the legend "4 amp." in Fig. 2.

In Fig. 2, also, in each of the phase-fault tripping-relays, such as the phase-A relays, I utilize an additional, sensitive contactor-switch or relay KA, for that phase, that is, one for each phase, having its operating coil connected in series-circuit relation between the CSA-coil and the trip-circuit 14A for that phase. The intermediate connection between the coils CSA and KA is indicated by the numeral 44A. The corresponding connections for the other two phases are indicated at 44B and 44C, respectively. For example, the KA relay may be a fairly low-resistance relay having a pick-up current value of four amperes, as indicated by the legend.

The resistance of the 1-ampere SG relay-coil should be as to limit the current which flows through the tripping-circuit to a value less than the four amperes, or other pick-up value, of the KA relay. In the particular apparatus which is illustrated in Fig. 2, the SG operating-coil had somewhat more resistance than was needed for the purpose of limiting the trip-circuit current during back-up time-delayed tripping-operations, and hence the operating-coil SG is shown as being shunted by a resistor R—11 in order to reduce the effective resistance which is interposed between the circuits 16 and 41.

In Fig. 2, the KA contactor-switch has a make-contact KA for establishing a holding-circuit between the conductors 16 and 44A. Although I have retained the previously utilized contactor CSA, in Fig. 2, it is obvious that this contactor-switch could be omitted, as the same essential function is accomplished by the KA relay.

In Fig. 2, also, I utilize a special master-controller relay having a separate make-contact MG for supplying another tripping-circuit for each of the trip-coils TCA, TCB and TCC. Thus, for example, the MG make-contact for the trip-circuit 14A joins that circuit directly to the positive bus (+). The control-means for the master-controller relay MG will be described later on.

In Fig. 2, I show the ground-relays, for convenience, underneath the phase-C relays. These relays include an auxiliary relay X3, the operating coil of which is shown in the first line of the schematic direct-current circuits for the ground-relays in Fig. 2. This auxiliary relay X3 is a slugged or slow-dropout relay, having a slugged or short-circuited coil or washer 48 which gives it a delay of about 30 cycles in its dropout-operation, in the particular installation illustrated in Fig. 2. The purpose of this delayed dropout-time of the X3 relay is for properly coordinating the single-pole tripping-operation and the reclosing operation, for reasons which are described in the Goldsborough Patent 2,320,861 on page 6, from line 72 of the first column to line 66 of the second column.

The X3-coil in Fig. 2 is shunted by the operating-coils JD and SGG of time-delay relay JD and an instantaneous auxiliary ground-fault relay SGG, the functions of which will be subsequently described.

The first line of the ground-relay direct-current connections in Fig. 2 shows an energizing-circuit 49 for the X3, JD, and SGG coils, this energizing-circuit being completed, from the positive bus (+), by any one of four parallel-connected circuit-paths. The first three of these four parallel-connected circuit-paths include the three back breaker-switches bA, bB and bC, while the fourth parallel-connected circuit-path, for energizing the circuit 49, includes a make-contact CXX, of the auxiliary ground-fault contactor-switch CXX, said CXX make-contact being connected between the circuit 49 and the circuit 15. The circuit 15 is energized from the positive bus (+), through the XG-coil, the conductor 13, and the two serially connected make-contacts DO and IO2, as described in connection with Fig. 1. The CXX-coil, in Fig. 2, is shown as being connected in series between the conductor 15 and a second conductor 15', which is used for directly energizing the CSG-coil through its resistor R1, and thence to the negative bus (—).

The energizing-circuits for the relay-coils X3, JD, and SGG are also shown as including three parallel-connected breaker-switches aA, aB and aC, which are connected between the coil X3 and the negative bus (—).

In Fig. 2, the ground-fault carrier-controlled tripping-contact RR is shown as being connected between the circuit 15' and a circuit 14', which is provided with three branched continuing-circuits which are shown, by way of example, as being similar to the control-system covered by the Goldsborough application Serial No. 569,181, Patent 2,462,179, for energizing the respective trip-circuit conductors 44A, 44B and 44C for the several trip-coils.

The first one of these three branched continuing-circuits, from the conductor 14', includes a make-contact SA, a serially connected back-contact SC, and a serially connected back-contact X3, for energizing a conductor 48A, which is connected to the phase-A trip-circuit conductor 44A through a Z3B back-contact which is shunted by a high-resistance actuating-coil CSX of an auxiliary relay. The second branched continuing-circuit, from the conductor 14', includes a make-contact SB, a serially connected back-contact SA, and a serially connected back-contact X3, for energizing a conductor 48B, which is connected to the phase-B trip-circuit conductor 44B through a Z3C back-contact which is shunted by a high-resistance actuating-coil CSY of an auxiliary relay. The third branched continuing-circuit, from the conductor 14', includes a make-contact SC, a serially connected back-contact SB, and a serially connected back-contact X3, for energizing a conductor 48C, which is connected to the phase-C trip-circuit conductor 44C through a Z3A back-contact which is shunted by a high-resistance actuating-coil CSZ of an auxiliary relay.

The three auxiliary relays CSX, CSY and CSZ have make-contacts CSX, CSY and CSZ, respectively, for connecting together the various trip-circuit conductors 44A, 44B and 44C, in pairs: the CSX-contacts connect the conductors 44B and 44C; the CSY-contacts connect the conductors 44A and 44C; while the CSZ contacts join the conductors 44A and 44B.

The energization of the master-tripping contactor-coil MG is next shown, in the Fig. 2 direct-current connections, in a panel marked "3-pole tripping." There are three energizing-circuits, and one holding-circuit, for connecting the MG-coil to the positive bus (+). The first energizing-circuit for the MG-coil includes a make-contact 101 which is in series with the CSO-coil, and which is shunted by a CSO make-contact. The second energizing-circuit for the MG-coil includes a make-contact JD of the time-delay relay JD. The third energizing-circuit for the MG-coil includes a make-contact SG of the sensitive phase-fault delayed-tripping auxiliary relay SG. The holding-circuit for the MG-coil comprises an MG make-contact. The energizing-circuit for the MG-coil is completed to the negative bus (—), by means of three parallel-connected breaker-switches aA, aB and aC.

The reclosing-circuits, as shown in the direct-current relaying-circuits of Fig. 2, are the same as in Fig. 1, except for the omission for simplicity of the manually controlled switches 3PH and RC, and with the further important exception of the subdivision of the reclosing-circuits into three separate closing-circuits, one for each of the three single-pole breakers 3A, 3B and 3C, each reclosing circuit being under the control of its own auxiliary breaker-contact bbA, bbB and bbC, respectively. It is to be understood, of course, that the manually controlled switches 3PH and RC of Fig. 1 could be, and frequently would be, used in a selective-pole reclosing-system of the type shown in Fig. 2.

The carrier-current panel, in Fig. 2, is identical to that which has already been shown and described in Fig. 1, and thus needs no further description.

The operation of the apparatus shown in Fig. 2 involves many features which have already been explained in connection with Fig. 1, and which thus need little extra explanation to point out the manner in which they apply to single-pole breaker-control rather than three-pole breaker-control. The operation of the Fig. 2 apparatus also involves a special operation of the particular selective-pole tripping system which has been chosen for illustration in Fig. 2, which is specifically described and claimed in the Goldsborough application Serial No. 569,181, Patent 2,462,179. The operation of the apparatus shown in Fig. 2 also involves certain new features, peculiar to my present invention, which will also be described in detail.

Referring, first, to the selective-pole tripping-operation of the apparatus shown in Fig. 2, it will be noted that there are three types of energizing-circuits for each of the three trip-coils, such as the trip-coil TCA of the phase-A single-pole breaker 3A in Fig. 2.

The first tripping-circuit for the trip-coil TCA is the phase-fault tripping-circuit including the conductor 21 at the contactor-coil CSA. This circuit has already been described, in connection with Fig. 1, but it differs from Fig. 1 in having the high-resistance SG-coil in series with the timer-controlling trip-circuit conductor 41. When either one of the two trip-circuit timer-contacts T2A or T3A is closed, the trip-circuit current which passes through the SG-coil is limited to a value less than four amperes, which is insufficient to effectively operate the trip-coil TCA. This small current, however, is sufficient to pick up the SG-relay and to close the SG make-contact which is in series with the MG operating-coil in the 3-pole tripping-panel, as shown below the ground-relay panel in Fig. 2. The MG-relay thereupon picks up and closes, not just one, but all three, of the trip-coil circuits 14A, 14B and 14C, as shown for the various phase-fault relays, such as the phase-A relay.

It will be noted, in Fig. 2, that the first-zone tripping-circuit, involving the make-contact Z1A; and the carrier-controlled tripping-circuit, involving the phase-fault receiver-relay tripping contact RR, the XA-coil, and the make-contact Z2A; are both instantaneous or undelayed tripping-circuits, which result in an immediate tripping-operation of the trip-coil (such as TCA) which is controlled by that particular phase-fault relay. It will be further noted, in Fig. 2, that each trip-coil TCA, TCB or TCC is controlled by its own phase-fault relay, for all instantaneous tripping-operations, while being controlled by the master-contactor MG, which effects a three-pole tripping-operation of all three circuit-breakers 3A, 3B and 3C, for all time-delayed phase-fault tripping. It will still further be noted, in Fig. 2, that an instantaneous tripping-operation will be obtained for as many single-pole breakers as are actuated by their own phase-fault relays, whether the number of line-phases affected by the fault is one, two or three.

The second tripping-circuit for the trip-coil TCA is a selector-controlled ground-fault tripping-circuit, such as the phase-A tripping-circuit which energizes the conductor 44A through the conductor 48A and the back-contact Z3B in Fig. 2. This is a carrier-supervised tripping-circuit, as shown by the presence of the ground-fault tripping-contact RR which is connected between the conductors 15' and 14' of the ground-relays in Fig. 2. The operation of this circuit depends upon the response or non-response of the faulted-phase selector-relays, such as the relays SA and SC, which is more particularly described and claimed in the Goldsborough application, Serial No. 569,181, Patent 2,462,179.

Thus, in the event of a single ground-fault within the confines of the protected line-section, and involving only the phase-A line-conductor, the corresponding phase-selector relay SA responds, and the other two phase-selector relays SB and SC remain unresponsive, thus energizing the trip-circuit conductor 44A before the sluggishly responding X3 back-contact gets open. On such a fault, the phase-B modified-impedance element Z3B does not respond, since a phase-A single-ground fault has been assumed. Consequently, the back-contacts Z3B remain closed, completing the phase-A tripping-circuit just described.

In the event of a two-phase-to-ground fault within the protected line-section, say a B-to-C-to-ground fault, the phase-fault relays in the leading faulted phase, in this case phase-B, will energize the phase-fault tripping-circuit for the phase-B circuit-breaker 3B, but it is necessary, also, to trip the phase-C circuit-breaker 3C, in order to clear the fault, because the phase-C line-conductor is also grounded by the fault. In such a case, the phase-C breaker is tripped by the ground-relay tripping-circuit for phase-C, because of the characteristics of the phase-selectors SA and SB.

On any double phase-to-ground fault, the phase-selector in the unfaulted phase, phase A on a BC ground-fault, always responds, because of the phase-relationships between the negative and zero-sequence current-components in the unfaulted phase. In practically all transmission-systems, the fault-resistance to ground will be higher than the phase-to-phase resistance of a double phase-to-ground fault, thus making the zero-sequence line-current component lead the negative-sequence line-current component, in the unfaulted phase, by a considerable phase, and causing a response of the phase-selector in the leading faulted phase, in this case phase-B, on a BC ground-fault. Thus, the response of the phase-A selector SA closes the selector-contact SA in series with the CSX-coil, in the ground-relay phase-A tripping-circuit, and energizes the CSX relay, because the shunt-connected back-contact Z3B is open, because of the response of the Z3B relay, as already explained. The energization of the CSX-coil does not cause a phase-A tripping-operation because of the high resistance of this coil, which limits the trip-circuit current to a value which is too low to effectively energize the trip-coil TCA; but the CSX make-contact closes, and energizes the phase-C trip-circuit 44C from the phase-B trip-circuit 44B.

The response of the two phase-selector relays SA and SB, on a BC ground-fault, does not energize the CSY-coil, because of the opening of the SA back-contact, thus avoiding an energization of the CSY-relay, which would energize the trip-circuit conductor 44A from the trip-circuit conductor 44C.

If, on some rare occasion, there should be a case of a BC ground-fault in the protected section, with the fault-resistance-to-ground substantially zero, or at least smaller than the phase-to-phase fault-resistance, the zero-sequence line-current component would then lag the negative-sequence component in the unfaulted phase, and the angle of this lag might be sufficient to cause a response of the phase-selector in the lagging faulted phase, in this case, phase-C. In such a case, the phase-C circuit breaker 3C is tripped on the ground-fault response through the SC make-contact in series with the back-contact SB of the unresponding phase-selector SB, the tripping-circuit being completed, to the conductor 44C, through the back-contact Z3A of the unresponding phase-fault relay in the unfaulted phase.

In these ground-fault tripping-circuits, with the phase-selector contacts selecting one or two of the trip-circuit conductors 44A, 44B or 44C, to be energized, under various fault-conditions, as just described, it will be noted that these phase-selector ground-fault tripping-circuits are supervised by the back-contacts Z3B, Z3C, and Z3A, respectively, of the several in-looking phase-fault impedance-elements. It is a novel feature of my invention that I supervise the phase-selector ground-fault tripping-operations in response to a different phase-fault impedance-element than the phase-fault impedance-element which is utilized to start carrier-current transmission, in any particular phase. Thus, my carrier-current transmission, in the event of a fault involving a response of the phase-A impedance-element, is initiated in response to an out-looking impedance-element ZEA, whereas the phase-A selector-responsive ground-fault tripping-circuit utilizes an unresponsive condition, or the back-contact, of an in-looking impedance-element Z3B in the next lagging phase.

The third tripping-circuit for the several tripping trip-coils TCA, TCB and TCC of the respective single-pole breakers is a circuit involving the make-contacts MG of the master tripping-controller MG. This MG-relay has three trip-circuit make-contacts MG which directly connect the positive bus (+) to each of the three trip-circuits 14A, 14B and 14C. It has already been noted that the MG-coil (shown in the 3-pole tripping-panel below the ground-relays in Fig. 2), has an energizing-circuit under the control of the make-contact SG of a relay SG which has its operating-coil SG connected in series with the trip-circuits involving either one of the two back-up tripping-circuits involving the second- and third-zone timers in each of the phases, such as the timer-contacts T2A and T3A in phase-A, for example. This means that the phase-fault tripping-circuits, which are instantaneously responsive to a fault, effectively energize only those trip-coils which correspond to the actuated impedance-relays, according to which phase or phases are faulted. On the other hand, the phase-fault relays, on any time-delayed tripping-action, do not cause a sufficient tripping-circuit current to effectively actuate the associated trip-coil, but the tripping-circuit current picks up the sensitive delayed-tripping selector SG, thus energizing the MG-relay which trips all three phases.

The MG-relay is also energized in response to the insensitive ground fault relay IOI, which has a make-contact IOI in series with the MG-coil, as shown in the 3-pole tripping-panel below the ground-relays in Fig. 2. This causes a three-pole tripping-operation whenever the insensitive or heavy-current-responsive ground-fault relay IOI responds. It will be noted that a single-pole or selective-pole ground-fault-responsive tripping-action is obtained only for a carrier-supervised tripping-operation which involves a response of the more sensitive ground-relay IO2, the carrier-supervision being provided by the receiver-relay contact RR between the conductors 15' and 14' in the ground-relay panel of Fig. 2.

In order to prevent a faulty operation of the heavy-current instantaneous ground-fault relay IOI, in response to the heavy apparent ground-current which may flow when only one or two poles of the circuit-breakers are momentarily open, the operating-coil of the fast ground-relay IOI is shunted by the auxiliary-relay make-contact SGG, which is already closed, in response to DO and IO2, and which shorts out the IOI relay, before the latter has had time to respond, whenever a heavy apparent ground-current appears after a ground-fault has been cleared by the opening of one (or two) of the circuit-breakers 3A, 3B or 3C in Fig. 2.

After a suitable time-delay after the occurrence of a ground-fault, the time-delay ground-relay JD closes its contact JD, according to its time-delay adjustment. When this happens, the contact JD energizes the operating-coil of the master-tripping relay MG, and thus causes a tripping-operation of all three circuit-breaker poles 3A, 3B and 3C. The time-delay relay JD prevents continued operation of the transmission system with one or two breaker-poles open; and it also provides back-up protection during the interval when the regular back-up relay IO1 is shorted by the SGG contact.

Thus I provide single-pole, or selective-pole, breaker-opening operations in response to first-zone phase-faults, carrier-cleared phase-faults, and carrier-cleared ground-faults; and I provide a three-pole breaker-opening operation on all other fault-responses. In the reclosing circuits of Fig. 2, I provide a reclosing-operation only on carrier-cleared faults, either phase-faults or ground-faults, which is the same principle of operation as in Fig. 1, the reclosing operation being limited, of course, to the breaker or breakers which were opened in response to the fault.

It is not necessary to reclose a single-pole breaker which has opened in response to a first-zone phase-fault tripping-operation, because the energization of the first-zone phase-fault tripping-circuit will be followed, within one or two cycles, by an energization of the carrier-supervised phase-fault tripping-circuit in that phase, and the reclosing-operation will be initiated in response to the carrier-supervised tripping-circuit, thus avoiding leaving the line-section operating, more than momentarily, with one or two of its phase-conductors interrupted by an opening of a single-pole breaker or breakers.

The operation of the Fig. 2 apparatus, with respect to the distance-reaches of the several phase-fault impedance-elements, as shown in Fig. 3, will be readily understood from the explanations which have already been given, in explaining the operation of the Fig. 1 apparatus. It will be noted that the "reach" of the in-looking third-zone elements Z3A, Z3B and Z3C, in Fig. 2, is indicated at Z3 in Fig. 3.

While I have illustrated my invention, in simplified diagrams, in connection with exemplary circuits and apparatus involving three-pole circuit-breakers 3 and single-pole breakers 3A, 3B and 3C, it should be noted that various features of the breaker-control are susceptible of substitution, from one system to the other, and various other changes may be made, as will be obvious to the skilled workers of the art, by way of the substitution of equivalents, or the omission of various details, or the addition of other details, without departing from the essential spirit of my invention. I desire, therefore, that the appended claims shall be accorded the broadest construction consistent with their language.

I claim as my invention:

1. A protective relaying system for controlling the circuit-interrupting means at the terminals of a line-section of a three-phase transmission-line, comprising: first-zone distance-and-direction-responsive relaying-means, at a given relaying-terminal, for quickly causing a circuit-interrupter opening-operation in selective response to in-looking faults less remote than the remote terminal of the protected line-section; second-zone distance-responsive relaying-means, at said given relaying-terminal, for quickly responding to faults reaching out to points beyond the remote terminal of the protected line-section; signal-controlling distance-and-direction-responsive relaying-means, responsive selectively to still another fault-range, for transmitting a signal to another terminal of the protected line-section; signal-controlled interrupter-controlling means for quickly causing a circuit-interrupter opening-operation in joint response to the second-zone relaying-means at the given relaying-terminal and the receipt of a signal from another terminal of the protected line-section; back-up time-delayed interrupter-controlling means for causing delayed circuit-interrupter opening-operations in response to faults outside of the protected line-section; and reclosing-means for causing an immediate reclosing-operation of the opened circuit-interrupting means; and means selectively responsive only to an energization of said signal-controlled interrupter-controlling means for making said reclosing-means effective.

2. A protective relaying system for controlling the circuit-interrupting means at the terminals of a line-section of a three-phase transmission-line, comprising: second-zone distance-responsive relaying-means, at said given relaying-terminal, for quickly responding to faults reaching out to points beyond the remote terminal of the protected line-section; signal-controlling distance-and-direction-responsive relaying-means, responsive selectively to still another fault-range, for transmitting a signal to another terminal of the protected line-section; signal-controlled interrupter-controlling means for quickly causing a circuit-interrupter opening-operation in joint response to the second-zone relaying-means at the given relaying-terminal and the receipt of a signal from another terminal of the protected line-section; other fault-responsive interrupter-controlling relaying-means for causing other fault-responsive circuit-interrupter opening-operations; reclosing-means for causing an immediate reclosing-operation of the opened circuit-interrupting means; and means selectively responsive only to an energization of said signal-controlled interrupter-controlling means for making said reclosing-means effective; and means selectively responsive to three-phase faults for blocking the operation of said reclosing means.

3. A protective relaying system for controlling the circuit-interrupting means at the terminals of a line-section of a three-phase transmission-line, comprising: first-zone distance-and-direction-responsive relaying-means, at a given relaying-terminal, for quickly causing a circuit-interrupter opening-operation in selective response to in-looking faults less remote than the remote terminal of the protected line-section; second-zone distance-and-direction - responsive relay-means, at said given relaying-terminal, for quickly responding selectively to in-looking faults reaching out to points beyond the remote terminal of the protected line-section; signal-controlling distance - and - direction - responsive relaying-means, responsive selectively to still another fault-range, for transmitting a signal to another terminal of the protected line-section; signal-controlled interrupter-controlling means for quickly causing a circuit-interrupter opening-operation in joint response to the second-zone relaying-means at the given relaying-terminal and the receipt of a signal from another terminal of the protected line-section; second-zone and third-zone back-up time-delayed interrupter-controlling means for causing delayed circuit-interrupter opening-operations in response to said second-zone and signal-controlling relaying-means, respectively; and reclosing-means for causing an immediate reclosing-operation of the opened circuit-interrupting means; and means selectively responsive only to an energization of said signal-controlled interrupter-controlling means for making said reclosing-means effective.

4. A protective relaying system for controlling the circuit-interrupting means at the terminals of a line-section of a three-phase transmission-line, comprising: second-zone distance-and-direction-responsive relaying-means, at said given relaying-terminal, for quickly responding selectively to in-looking faults reaching out to points beyond the remote terminal of the protected line-section; signal-controlling distance-and-direction-responsive relaying-means, responsive selectively to still another fault-range, for transmitting a signal to another terminal of the protected line-section; said second-zone and signal-controlling relaying-means each including ground-fault relaying - means for responding selectively to ground-faults, and phase-fault relaying-means for responding to different phase-faults involving different phases of the protected line-section; signal-controlled interrupter-controlling means for quickly causing a circuit-interrupter opening-operation in joint response to the second-zone relaying-means at the given relaying-terminal and the receipt of a signal from another terminal of the protected line-section; other fault-responsive interrupter-controlling relaying-means for causing other fault-responsive circuit-interrupter opening-operations; and reclosing-means for causing an immediate reclosing-operation of the opened circuit-interrupting means; and means selectively responsive only to an energization of said signal - controlled interrupter - controlling means for making said reclosing-means effective.

5. A protective relaying system for controlling a set of single-pole circuit-interrupting means in the three phase-conductors at each of a plurality of terminals of a protected line-section of a three-phase transmission-line, comprising: sensitive signal-controlling fault-responsive directional relaying-means, quickly responsive to out-looking faults at a given relaying-terminal, for transmitting a signal to another terminal of the protected line-section; a plurality of phase-selective fault-responsive relaying-means, at said given relaying-terminal, for quickly responding selectively to faults reaching out to points beyond the remote terminal of the protected line-section, according to which phase is faulted; signal-controlled fault-responsive interrupter-controlling means for quickly causing a circuit-interrupter opening-operation of the affected phase in joint response to a particular phase-selective relaying-means and the receipt of said signal from another terminal of the protected line-section; and insensitive ground-fault relaying-means, responsive to relatively heavy ground-fault currents, for causing a circuit-interrupter opening-operation in all three phases of the protected line-section, at said given line-terminal, regardless of which phase is faulted.

6. The invention as defined in claim 5, in combination with reclosing-means, selectively responsive only to an energization of said signal-controlled interrupter-controlling means, for causing an immediate reclosing-operation of the opened circuit-interrupting means.

7. A protective relaying system for controlling a set of single-pole circuit-interrupting means in the three phase-conductors at each of a plurality of terminals of a protected line-section of a three-phase transmission-line, comprising: sensitive signal-controlling ground-fault-responsive directional relaying-means, quickly responsive to out-looking faults at a given relaying-terminal, for transmitting a signal to another terminal of the protected line-section; phase-selector relaying-means, at said given relaying-terminal, for aiding in selecting the faulted phase in the event of an unbalanced ground-fault; signal-controlled ground-fault-responsive interrupter-controlling means for quickly causing a circuit-interrupter opening-operation of the affected phase in joint response to an in-looking ground-fault current, a particular phase-selector response, and the receipt of said signal from another terminal of the protected line-section; and insensitive ground-fault relaying-means, responsive to relatively heavy ground-fault currents, for causing a circuit-interrupter opening-operation in all three phases of the protected line-section, at said given line-terminal, regardless of which phase is faulted.

8. A protective relaying system for controlling a set of single-pole circuit-interrupting means in the three phase-conductors at each of a plurality of terminals of a protected line-section of a three-phase transmission-line, comprising: signal-controlling phase-fault-responsive directional relaying-means, quickly responsive to out-looking faults at a given relaying-terminal, for transmitting a signal to another terminal of the protected line-section; a plurality of second-zone distance-and-direction-responsive phase - fault relaying-means, at said given relaying-terminal, for quickly responding selectively to in-looking faults reaching out to points beyond the remote terminal of the protected line-section, according to which phase is faulted; signal-controlled phase - fault - responsive interrupter-controlling means for quickly causing a circuit-interrupter opening-operation of the affected phase in joint response to a particular second-zone phase-fault relaying-means and the receipt of said signal from another terminal of the protected line-section; a plurality of first-zone distance-and-direction-responsive phase-fault relaying-means, at said given relaying-terminal, for quickly causing a circuit-interrupter opening-operation of the affected phase in selective response to in-looking faults less remote than the remote terminal of the protected line-section, according to which phase is faulted; time-delayed interrupter-controlling means, responsive to a fault-range including faults outside of the protected line-section, for causing a delayed circuit-interrupter opening-operation in all three phases of the protected line-section, at said given line-terminal, regardless of which phase is faulted; and reclosing-means, selectively responsive only to an energization of one of said signal-controlled interrupter-controlling means, for causing an immediate reclosing-operation of the opened circuit-interrupting means.

9. The invention as defined in claim 8, characterized by said signal-controlling relaying-means including a distance-and-direction-responsive relaying-means which has a long distance-reach for out-looking phase-faults and a short but substantial distance-reach for in-looking phase-faults, said short but substantial distance-reach being less than half the length of the protected line-section.

10. A protective relaying system for controlling a set of single-pole circuit-interrupting means in the three phase-conductors at each of a plurality of terminals of a protected line-section of a three-phase transmission-line, comprising: sensitive signal-controlling ground-fault-responsive and phase-fault-responsive directional relaying-means, quickly responsive to out-looking faults at a given relaying-terminal, for transmitting a signal to another terminal of the protected line-section; phase-selector relaying-means, at said given relaying-terminal, for aiding in selecting the faulted phase in the event of an unbalanced ground-fault; signal-controlled ground-fault-responsive interrupter-controlling means for quickly causing a circuit-interrupter opening-operation of the affected phase in joint response to an in-looking ground-fault current, a particular phase-selector response, and the receipt of said signal from another terminal of the protected line-section; a plurality of second-zone distance-and-direction-responsive phase-fault relaying-means, at said given relaying-terminal, for quickly responding selectively to in-looking faults reaching out to points beyond the remote terminal of the protected line-section, according to which phase is faulted; signal-controlled phase-fault-responsive interrupter-controlling means for quickly causing a circuit-interrupter opening-operation of the affected phase in joint response to a particular second-zone phase-fault relaying-means and the receipt of said signal from another terminal of the protected line-section; a plurality of first-zone distance-and-direction-responsive phase-fault relaying-means, at said given relaying-terminal, for quickly causing a circuit-interrupter opening-operation of the affected phase in selective response to in-looking faults less remote than the remote terminal of the protected line-section, according to which phase is faulted; time-delayed interrupter-controlling means, responsive to a fault-range including faults outside of the protected line-section, for causing a delayed circuit-interrupter opening-operation in all three phases of the protected line-section, at said given line-terminal, regardless of which phase is faulted; and reclosing-means, selectively responsive only to an energization of one of said signal-controlled interrupter-controlling means, for causing an immediate reclosing-operation of the opened circuit-interrupting means.

11. The invention as defined in claim 10, in combination with insensitive ground-fault relaying-means, responsive to relatively heavy ground-fault currents, for causing a circuit-interrupter opening-operation in all three phases of the protected line-section, at said given line-terminal, regardless of which phase is faulted.

12. The invention as defined in claim 10, characterized by the sensitive signal-controlling phase-fault-responsive directional relaying-means, for transmitting a signal, including a distance-and-direction-responsive relaying-means which has a long distance-reach for out-looking phase-faults and a short but substantial distance-reach for in-looking phase-faults; and further characterized by said phase-selector relaying-means including a plurality of distance-and-direction-responsive phase-fault relaying-means which have a long distance-reach for in-looking phase-faults, according to which phase is faulted, and a short but substantial distance-reach for out-looking faults; the short but substantial distance-reaches being each less than half the length of the protected line-section.

13. A protective relaying system for controlling the circuit-interrupting means at the terminals of a line-section of a three-phase transmission-line, comprising: first-zone distance-and-direction-responsive relaying-means, at a given relaying-terminal, for quickly causing a circuit-interrupter opening-operation in selective response to in-looking faults less remote than the remote terminal of the protected line-section; second-zone distance-and-direction-responsive relaying-means, at said given relaying-terminal, for causing a delayed circuit-interrupter opening-operation in selective response to in-looking faults reaching out to points beyond the remote terminal of the protected line-section; and other direction-responsive relaying-means, at said given relaying-terminal, for causing a still more greatly delayed circuit-interrupter opening-operation in selective response to out-looking faults, said other direction-responsive relaying-means including a distance-and-direction-responsive relaying-means which has a long distance-reach for out-looking phase-faults and a short but substantial distance-reach for in-looking phase faults, said short but substantial distance-reach being less than half the length of the protected line-section.

14. A protective relaying system for controlling the circuit-interrupting means at the terminals of a line-section of a three-phase transmission-line, comprising: first-zone distance-and-direction-responsive relaying-means, at a given relaying-terminal, for quickly causing a circuit-interrupter opening-operation in selective response to in-looking faults less remote than the remote terminal of the protected line-section; second-zone distance-and-direction-responsive relaying-means, at said given relaying-terminal, for causing a delayed circuit-interrupter opening-operation in selective response to in-looking faults reaching out to points beyond the remote terminal of the protected line-section; and other direction-responsive relaying-means, at said given relaying-terminal, for causing a still more greatly delayed circuit-interrupter opening-operation in selective response to out-looking faults; said second-zone relaying-means including a distance-and-direction-responsive relaying-means which has a long distance-reach for in-looking phase-faults and a short distance-reach for out-looking phase-faults; and said other direction-responsive relaying-means including a distance-and-direction-responsive relaying-means which has a long distance-reach for out-looking phase-faults and a short but substantial distance-reach for in-looking phase-faults, the short but substantial distance-reaches being each less than half the length of the protected line-section.

15. A protective relaying system for controlling the circuit-interrupting means at the terminals of a line-section of a three-phase transmission-line, comprising: first-zone distance-and-direction-responsive relaying means, at a given relaying-terminal, for quickly causing a circuit-interrupter opening-operation in selective response to in-looking faults less remote than the remote terminal of the protected line-section; second-zone ground-fault direction-responsive relaying-means, at said given relaying-terminal, for causing a delayed circuit-interrupter opening-operation in selective response to in-looking ground faults; second-zone phase-fault distance-and-direction-responsive relaying-means, at said given relaying-terminal, for causing a delayed circuit-interrupter opening-operation in selective response to in-looking phase-faults reaching out to points beyond the remote terminal of the protected line-section; and other phase-fault distance - and - direction - responsive relaying-means, at said given relaying-terminal, for causing a still more greatly delayed circuit-interrupter opening-operation in selective response to out-looking phase-faults.

16. A protective relaying system for controlling the circuit-interrupting means at the terminals of a line-section of a three-phase transmission-line, comprising: second-zone distance-responsive relaying-means, at a given relaying-terminal, for quickly responding to faults reaching out to points beyond the remote terminal of the protected line-section; signal-controlling distance - and - direction - responsive relaying-means, responsive selectively to out-looking faults, for transmitting a signal to another terminal of the protected line-section, said signal-controlling relaying-means including a distance-and-direction-responsive relaying-means which has a long distance-reach for out-looking phase-faults and a short but substantial distance-reach for in-looking phase-faults, said short but substantial distance-reach being less than half the length of the protected line-section; and signal-controlled interrupter-controlling means for quickly causing a circuit-interrupter opening-operation in joint response to the second-zone relaying-means at the given relaying-terminal and the receipt of a signal from another terminal of the protected line-section.

17. A protective relaying system for controlling the circuit-interrupting means at the terminals of a line-section of a three-phase transmisson-line, comprising: first-zone distance-and-direction-responsive relaying-means, at a given relaying-terminal, for quickly causing a circuit-interrupter opening-operation in selective response to in-looking faults less remote than the remote terminal of the protected line-section; second-zone distance-responsive relaying-means, at said given relaying-terminal, for quickly responding to faults reaching out to points beyond the remote terminal of the protected line-section; signal-controlling distance-and-direction-responsive relaying-means, responsive selectively to out-looking faults, for transmitting a signal to another terminal of the protected line-section, said signal-controlling relaying-means including a distance-and-direction-responsive relaying-means which has a long distance-reach for out-looking phase-faults and a short but substantial distance-reach for in-looking phase-faults, said short but substantial distance-reach being less than half the length of the protected line-section; signal-controlled interrupter-controlling means for quickly causing a circuit-interrupter opening-operation in joint response to the second-zone relaying-means at the given relaying-terminal and the receipt of a signal from another terminal of the protected line-section; and back-up time-delayed interrupter-controlling means for causing delayed circuit-interrupter opening-operations in response to faults outside of the protected line-section.

18. The invention as defined in claim 17, in combination with reclosing-means, selectively responsive only to an energization of said signal-controlled interrupter-controlling means, for causing an immediate reclosing-operation of the opened circuit-interrupting means.

19. A protective relaying system for controlling the circuit-interrupting means at the terminals of a line-section of a three-phase transmission-line, comprising: first-zone distance-and-direction-responsive relaying-means, at a given relaying-terminal, for quickly causing a circuit-interrupter opening-operation in selective response to in-looking faults less remote than the remote terminal of the protected line-section; second-zone distance-and-direction-responsive relaying-means, at said given relaying-terminal, for quickly responding selectively to in-looking faults reaching out to points beyond the remote terminal of the protected line-section; signal-controlling distance-and-direction-responsive relaying-means, responsive selectively to out-looking faults, for transmitting a signal to another terminal of the protected line-section; timer-means having successively closing second-zone and third-zone timer-contacts; means for initiating an operation of said timer-means in response to an operation of either said second-zone distance-and-direction-responsive relaying-means or said signal - controlling distance - and-direction-responsive relaying-means; signal-controlled interrupter-controlling means for quickly causing a circuit-interrupter opening-operation in joint response to the second-zone relaying-means at the given relaying-terminal and the receipt of a signal from another terminal of the protected line-section; second-zone back-up time-delayed interrupter-controlling means for causing a delayed circuit-interrupter opening-operation in joint response to said second-zone relaying-means and said second-zone timer-contact; and third-zone back-up time-delayed interrupter-controlling means for causing a delayed circuit-interrupter opening-operation in joint response to said third-zone relaying-means and said third-zone timer-contact.

20. The invention as defined in claim 19, characterized by said signal-controlling relaying-means including a distance-and-direction-responsive relaying-means which has a long distance-reach for out-looking phase-faults and a short but substantial distance-reach for in-looking phase-faults, said short but substantial distance-reach being less than half the length of the protected line-section.

21. The invention as defined in claim 19, in combination with reclosing-means, selectively responsive only to an energization of said signal-controlled interrupter-controlling means, for causing an immediate reclosing-operation of the opened circuit-interrupting means.

JOHN L. BLACKBURN.

REFERENCES CITED

The following references are of record in the file of this patent:

UNITED STATES PATENTS

| Number | Name | Date |
|---|---|---|
| 1,920,329 | Trippett | Aug. 1, 1933 |
| 2,329,043 | Goldsborough | Sept. 7, 1943 |
| 2,416,677 | Blackburn | Mar. 4, 1947 |
| 2,462,179 | Goldsborough | Feb. 22, 1949 |

OTHER REFERENCES

Electrical World, Sept. 30, 1944, pages 68 and 69.